(No Model.) 2 Sheets—Sheet 1.
D. D. PRICE & R. J. DANIELS.
VEHICLE.
No. 520,830. Patented June 5, 1894.
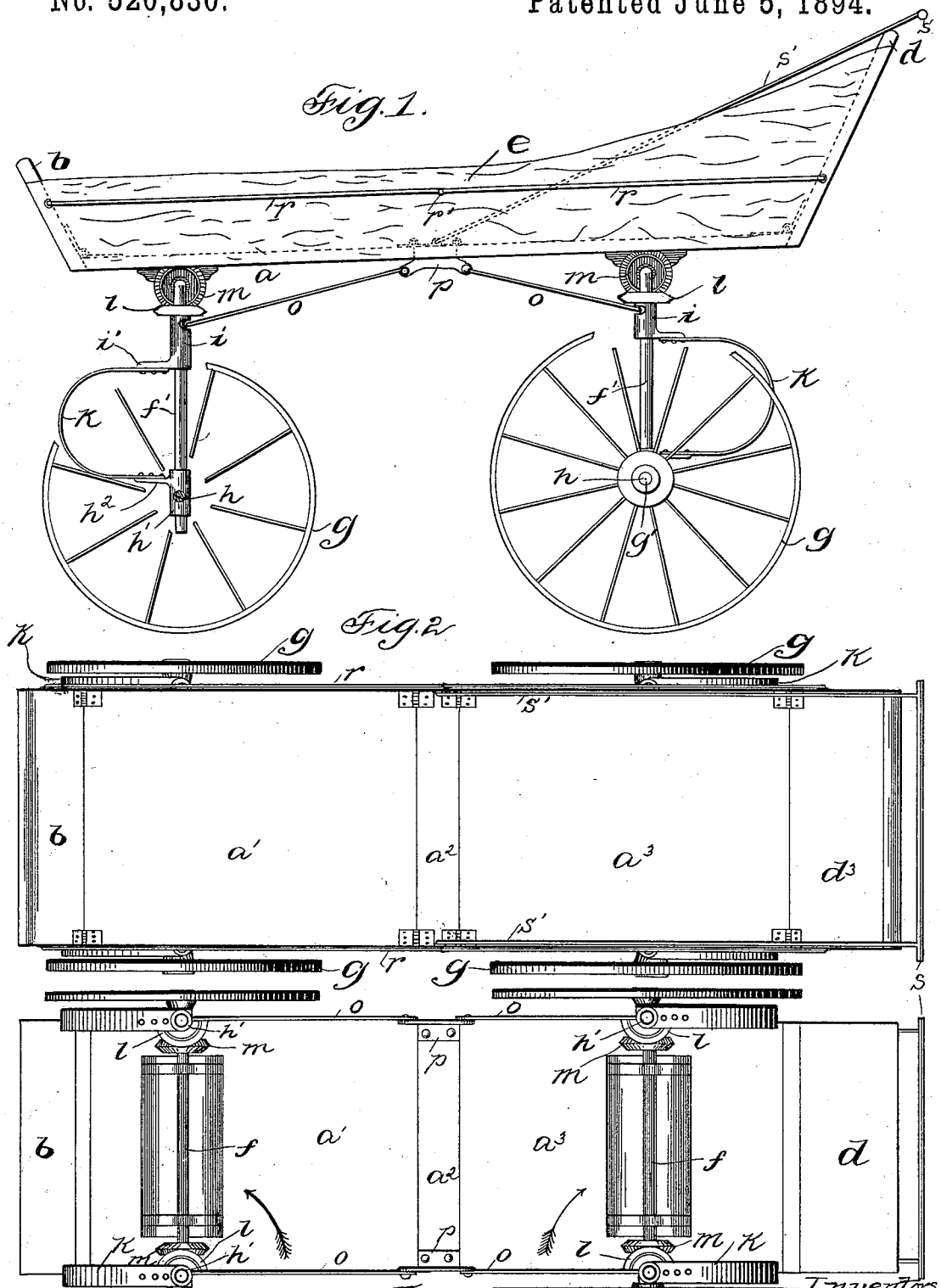
Witnesses
George L. Cragg
George S. Buell
Inventors
David D. Price
Richard J. Daniels
By Barton & Brown attys

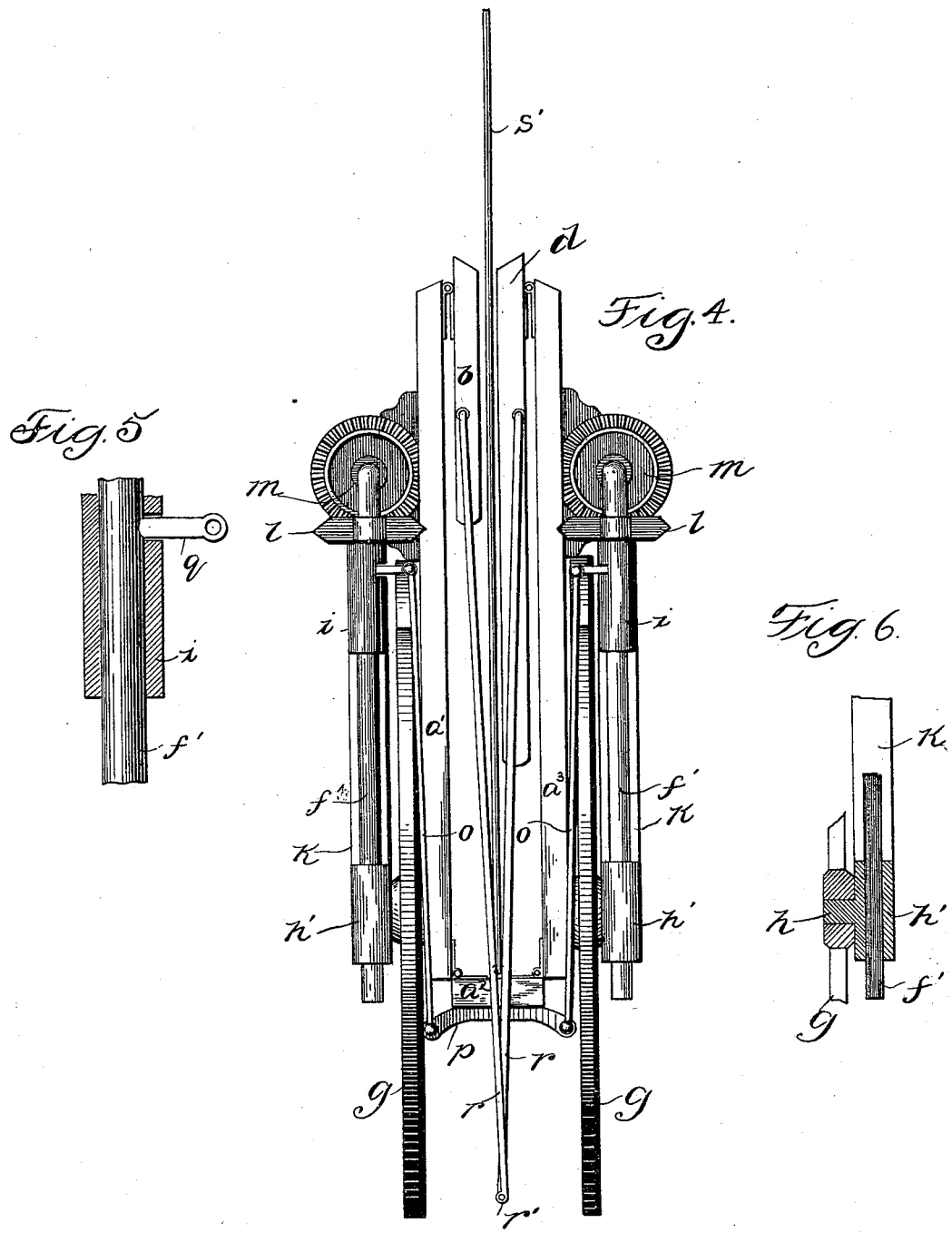

UNITED STATES PATENT OFFICE.

DAVID D. PRICE AND RICHARD J. DANIELS, OF CHICAGO, ILLINOIS.

VEHICLE.

SPECIFICATION forming part of Letters Patent No. 520,830, dated June 5, 1894.

Application filed August 26, 1893. Serial No. 484,148. (No model.)

*To all whom it may concern:*

Be it known that we, DAVID D. PRICE and RICHARD J. DANIELS, citizens of the United States, residing at Chicago, in the county of Cook and State of Illinois, have invented a certain new and useful Improvement in Vehicles, (Case No. 1,) of which the following is a full, clear, concise, and exact description, reference being had to the accompanying drawings, forming a part of this specification.

Our invention relates to vehicles, and more particularly to that class of vehicles known as perambulators.

It has for its object the construction of vehicles wherein the parts are so associated and united that the vehicles may be readily folded in convenient and compact form for the purpose of storage in transit, and general convenience.

Our invention consists in a vehicle having a folding body, the wheels being so mounted that they may be rotated into planes parallel with the folded sections of the body.

In the preferred embodiment of our invention, the head and foot boards, as well as the bottom are hinged so that they may, when folded, occupy parallel positions; the wheels are independently mounted and capable, first, of a rotation into a plane perpendicular to the plane of the normal position, and, second, of a bodily rotation about an axis without the wheel whereby the wheel is brought into a position parallel to the folded sections of the body.

Our invention will be more readily understood by reference to the accompanying drawings, in which—

Figure 1 is a side elevation of our improved vehicle in condition for use. Fig. 2 is a top view thereof. Fig. 3 is a bottom view thereof. Fig. 4 is a side elevation of our improved vehicle with the parts thereof folded in compact form. Fig. 5 is a detail of the mechanism. Fig. 6 is a detail showing the method of mounting the wheels.

Like parts are referred to by similar letters of reference throughout the different views.

The carriage may be made in any desired form and of any suitable material.

The carriage body consists essentially of a bottom $a$ made up in three sections $a'$ $a^2$ $a^3$, the sections $a'$ and $a^3$ being hinged to the center section $a^2$, foot board $b$ hinged to section $a'$, head piece $d$ hinged to section $a^3$, and the sides $e$ made of flexible material, as cloth or carpet. Angular supports $f$ $f$ are rotatably mounted upon cleats fastened beneath the floor of the carriage. The wheels $g$ $g$ $g$ are provided with ordinary hubs $g'$ journaled upon cylindrical extensions $h$ of bearings $h'$, which bearings are capable of vertical excursion upon arms $f'$ of angular supports $f$. Cylindrical collars $i$ $i$ surround arms $f'$ $f'$. Springs $k$ $k$ are provided as cushions for the carriage body, projections $h^2$ $i'$ being provided upon parts $h'$ and $i$, to which the springs are fastened. The arms $f'$ $f'$ being movable with relation to the wheel supports $h'$ it will be readily seen that the springs $k$ $k$ perform the usual function of carriage springs, and that this function is performed to greater perfection, since each wheel is independent of the other.

The method of mounting the wheels of the vehicle which we have shown, gives each one a capacity for separate perpendicular motion, and has the advantage of preventing the jar which arises when one wheel of a pair fixed to rotate on the same axle, passes over an obstruction.

The carriage as shown in Figs. 1, 2 and 3, is arranged for use.

We will now describe the mechanism which is employed to fold the carriage. Gears $l$ $l$, made preferably in the form of a half circle, are preferably cast integral with the cylinders $i$ $i$; these gears mesh with gears $m$ $m$ fixed upon the horizontal portion of angular supports $f$ $f$. Levers $o$ $o$ connect arms $f'$ $f'$ with the brackets $p$, the connections being pivotal. The connection between the arms $f'$ $f'$ and levers $o$ is made preferably through the medium of link $q$ secured to links $f'$ $f'$, as shown in Fig. 5. A brace $r$ on each side of the carriage, jointed at $r'$ much in the same manner as the joint in the supporting ribs of buggy tops, is pivoted at its extremities to the head and foot boards of the carriage. The handle $s$ is secured to the carriage by the rods $s'$ $s'$ pivoted to the middle section $a^2$ of the carriage bottom.

When it is desired to fold the carriage the braces $r$ are depressed in the middle, the handle $s$ is raised in vertical line with section $a^2$ and a downward pressure exerted thereon. As section $a^2$ is pressed downward the parts are gradually caused to assume the position shown in Fig. 4. While the central section $a^2$ is being thus depressed, the levers $o\,o$ gradually turn the arms $f'\,f'$ until they become parallel with portions $a'\,a^3$ of the bottom of the carriage, as shown in Fig. 4, while at the same time gears $m$ rotate gear wheels $l$ a quarter revolution in the direction indicated by the arrows in Fig. 3. The gears being integral with collars $i$, swing the wheels $g$ through a quadrant and bring them close to sections $a'\,a^3$ with the springs $k\,k$ upon the outside, thus folding the carriage to a very small and convenient size for shipment and storage.

The parts are so proportioned that when the carriage is folded as shown in Fig. 4, the wheels are free to rotate enabling the carriage to be readily moved upon the ground from place to place.

In Fig. 4 we have shown the flexible sides $e$ removed, to illustrate clearly the position of the parts.

The levers $o\,o$ have, in addition to the function of folding the supports $f\,f$, the office of preventing the arms $f'\,f'$ of said supports, from spreading outward when the carriage is in condition for use.

We have shown the material of which the carriage body is composed as consisting of some solid material, as wood. It is obvious that by using basket work the carriage, when folded, may be made to occupy a smaller space.

We do not desire to limit ourselves to the precise construction shown, nor to the employment of the combination of levers and gear wheels shown, since other mechanism may be devised without departing from our invention, and lever mechanism may be substituted for the gearing shown and described; but Thus having described our invention, what we claim as new, and desire to secure by Letters Patent, is—

1. In a carriage body, the combination with a bottom composed of sections $a'\,a^2\,a^3$ hinged together, of head and foot boards $d\,b$ hinged to said bottom, substantially as described.

2. In a vehicle, the combination with a body composed of hinged sections adapted, when folded, to occupy parallel positions, of wheels mounted to rotate about vertical and horizontal axes, whereby they may be brought into planes parallel to said folded sections, substantially as described.

3. In a vehicle, a carriage body made up of hinged sections, in combination with angular supports $f\,f$ secured thereto, wheels $g\,g$ journaled upon the arms thereof, springs $k\,k$ interposed between the carriage and the wheel, substantially as described.

4. In a vehicle, a carriage body made up of hinged sections, angular supports $f\,f$ rigidly supporting gears $m\,m$, gears $l\,l$ in engagement with gears $m\,m$, connections between said gears $l\,l$ and the wheels, whereby, when motion is imparted to the gear wheels a corresponding rotary motion may be imparted to the wheels on a vertical axis, substantially as described.

5. In a vehicle, a carriage body made up of hinged sections, supports $f\,f$ provided with arms $f'\,f'$, gear wheels $m\,m$ secured to supports $f\,f$, gear wheels $l\,l$ secured to collars $i\,i$ surrounding said arms $f'\,f'$, levers $o\,o$ connected between said arms $f'\,f'$ and the carriage body, bearings $h'\,h'$ adapted to support wheels $g\,g$, springs $k\,k$ interposed between the body of the carriage and the wheels, and means for securing the body in an open position, substantially as described.

6. In a vehicle, a carriage body made up of hinged sections, wheels $g\,g$ supporting said carriage body through the medium of angular supports $f\,f$, levers $o\,o$ to bring said angular supports close to the carriage body, and means for rotating the wheels and vertical axles whereby they may be brought into snug position, substantially as described.

7. In a vehicle, a carriage body made up of hinged sections, wheels $g\,g$ supporting the same, and means for folding the wheels close to the carriage body, substantially as described.

8. In a vehicle, the combination with a carriage body, of wheels adapted to flexibly support said body, said wheels being adapted to have separate perpendicular motion with relation to said body, substantially as described.

9. In a vehicle, the combination with a vertical shaft, of a bearing adapted to move longitudinally thereon, a wheel journaled to said bearing, and a resilient connection between said bearing and the vehicle body, substantially as described.

10. In a vehicle, the combination with a vertical shaft, adapted to be rotated about a horizontal axis, of a bearing provided thereon and adapted to be rotated upon said shaft as an axis, and a wheel journaled to said bearing, substantially as described.

11. In a vehicle, the combination with an independently mounted wheel, of mechanism for simultaneously moving said wheel about a vertical and a horizontal axis, substantially as described.

In witness whereof we hereunto subscribe our names this 21st day of August, A. D. 1893.

DAVID D. PRICE.
RICHARD J. DANIELS.

Witnesses:
HARRIET G. TEMPLETON,
GEORGE L. CRAGG.